(12) United States Patent
Kitamura

(10) Patent No.: US 10,409,209 B2
(45) Date of Patent: Sep. 10, 2019

(54) IMAGE FORMING APPARATUS, PHOTOCONDUCTOR FILM THICKNESS ESTIMATION METHOD, AND ESTIMATION PROGRAM

(71) Applicant: Konica Minolta, Inc., Chiyoda-ku, Tokyo (JP)

(72) Inventor: Kazuya Kitamura, Nagoya (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/802,572

(22) Filed: Nov. 3, 2017

(65) Prior Publication Data

US 2018/0135958 A1 May 17, 2018

(30) Foreign Application Priority Data

Nov. 15, 2016 (JP) .................................. 2016-222263

(51) Int. Cl.
*G03G 15/00* (2006.01)
*G01B 7/06* (2006.01)
(Continued)

(52) U.S. Cl.
CPC ........... *G03G 15/5037* (2013.01); *G01B 7/06* (2013.01); *G03G 5/043* (2013.01);
(Continued)

(58) Field of Classification Search
CPC ....................... G03G 15/5037; G03G 15/5045
See application file for complete search history.

(56) References Cited

U.S. PATENT DOCUMENTS 5,019,862 A * 5/1991 Nakamura ......... G03G 15/5037
399/44
5,191,362 A * 3/1993 Ichikawa ............... G03G 15/08
347/131

(Continued)

FOREIGN PATENT DOCUMENTS

JP 2008-107571 A 5/2008
JP 2011-28102 A 2/2011
JP 2015-148789 A 8/2015

OTHER PUBLICATIONS

English machine translation of JP 6043739(B2) corresponding to JP 2015-148789 (A).*

(Continued)

*Primary Examiner* — Walter L Lindsay, Jr.
*Assistant Examiner* — Arlene Heredia
(74) *Attorney, Agent, or Firm* — Buchanan Ingersoll & Rooney PC

(57) ABSTRACT

An image forming apparatus includes a photoconductor, a charging roller for charging the photoconductor, a current sensor for detecting a value of current flowing through the photoconductor or the charging roller as a result of application of voltage to the charging roller, an acquisition sensor for acquiring an environment value representing an environment state inside the image forming apparatus, and a processor configured to estimate a film thickness of the photoconductor, based on a value of current detected by the current sensor when a state in which the environment value falls within a predetermined range continues for a predetermined time or longer.

20 Claims, 16 Drawing Sheets

(51) Int. Cl.
  *G03G 15/02* (2006.01)
  *G03G 21/20* (2006.01)
  *G03G 5/043* (2006.01)
  *G03G 15/043* (2006.01)

(52) U.S. Cl.
  CPC ..... *G03G 15/0216* (2013.01); *G03G 15/0266* (2013.01); *G03G 15/0283* (2013.01); *G03G 15/043* (2013.01); *G03G 15/553* (2013.01); *G03G 21/203* (2013.01); *G03G 2215/025* (2013.01)

(56) References Cited

U.S. PATENT DOCUMENTS

| | | | |
|---|---|---|---|
| 6,785,482 B2 * | 8/2004 | Ogata | G03G 15/1675 399/55 |
| 2002/0127026 A1 * | 9/2002 | Kubota | G03G 15/5037 399/48 |
| 2005/0063719 A1 * | 3/2005 | Reihl | B41J 2/45 399/38 |
| 2007/0140713 A1 * | 6/2007 | Shima | G03G 15/0266 399/26 |
| 2015/0234338 A1 * | 8/2015 | Murauchi | G03G 15/80 399/50 |

OTHER PUBLICATIONS

English machine translation of JP 2008-107571.*
First Office Action dated Jan. 28, 2019, by the State Intellectual Property Office of the People's Republic of China, in corresponding Chinese Patent Application No. 201711094045.X and English translation of the Office Action. (22 pages).

* cited by examiner

FIG.11

| TEMPERATURE | PREDETERMINED RANGE $\Delta c$ |
|---|---|
| 10°C OR HIGHER AND LOWER THAN 12°C | ±1°C |
| 12°C OR HIGHER AND LOWER THAN 15°C | ±2°C |
| 15°C OR HIGHER AND LOWER THAN 20°C | ±3°C |
| 20°C OR HIGHER AND LOWER THAN 30°C | ±4°C |

| TEMPERATURE | PREDETERMINED RANGE Δc | PREDETERMINED TIME th |
|---|---|---|
| 10°C OR HIGHER AND LOWER THAN 12°C | ±1°C | EQUAL TO OR LONGER THAN 8hr |
| 12°C OR HIGHER AND LOWER THAN 15°C | ±2°C | EQUAL TO OR LONGER THAN 7hr |
| 15°C OR HIGHER AND LOWER THAN 20°C | ±3°C | EQUAL TO OR LONGER THAN 6hr |
| 20°C OR HIGHER AND LOWER THAN 30°C | ±4°C | EQUAL TO OR LONGER THAN 5hr |

FIG.13

126B

| TEMPERATURE | PREDETERMINED RANGE Δc | HUMIDITY Δd | PREDETERMINED TIME th |
|---|---|---|---|
| 10°C OR HIGHER AND LOWER THAN 12°C | ±1°C | 10~50% | EQUAL TO OR LONGER THAN 8hr |
| | | 50~90% | EQUAL TO OR LONGER THAN 8hr |
| 12°C OR HIGHER AND LOWER THAN 15°C | ±2°C | 10~50% | EQUAL TO OR LONGER THAN 8hr |
| | | 50~90% | EQUAL TO OR LONGER THAN 8hr |
| 15°C OR HIGHER AND LOWER THAN 20°C | ±3°C | 10~50% | EQUAL TO OR LONGER THAN 8hr |
| | | 50~90% | EQUAL TO OR LONGER THAN 8hr |
| 20°C OR HIGHER AND LOWER THAN 30°C | ±4°C | 10~50% | EQUAL TO OR LONGER THAN 8hr |
| | | 50~90% | EQUAL TO OR LONGER THAN 8hr |

126C

| TEMPERATURE | PREDETERMINED NUMBER |
|---|---|
| 10°C OR HIGHER AND LOWER THAN 12°C | 10 SHEETS |
| 12°C OR HIGHER AND LOWER THAN 15°C | 20 SHEETS |
| 15°C OR HIGHER AND LOWER THAN 20°C | 50 SHEETS |
| 20°C OR HIGHER AND LOWER THAN 30°C | 100 SHEETS |

| TEMPERATURE | HUMIDITY | |
|---|---|---|
| | 10% OR HIGHER AND LOWER THAN 50% | 50% OR HIGHER AND LOWER THAN 90% |
| 10°C OR HIGHER AND LOWER THAN 12°C | RELATIONAL EXPRESSION 1 BETWEEN FILM THICKNESS AND CHARGING CURRENT | RELATIONAL EXPRESSION 2 BETWEEN FILM THICKNESS AND CHARGING CURRENT |
| 12°C OR HIGHER AND LOWER THAN 15°C | RELATIONAL EXPRESSION 3 BETWEEN FILM THICKNESS AND CHARGING CURRENT | RELATIONAL EXPRESSION 4 BETWEEN FILM THICKNESS AND CHARGING CURRENT |
| 15°C OR HIGHER AND LOWER THAN 20°C | RELATIONAL EXPRESSION 5 BETWEEN FILM THICKNESS AND CHARGING CURRENT | RELATIONAL EXPRESSION 6 BETWEEN FILM THICKNESS AND CHARGING CURRENT |
| 20°C OR HIGHER AND LOWER THAN 30°C | RELATIONAL EXPRESSION 7 BETWEEN FILM THICKNESS AND CHARGING CURRENT | RELATIONAL EXPRESSION 8 BETWEEN FILM THICKNESS AND CHARGING CURRENT |

IMAGE FORMING APPARATUS, PHOTOCONDUCTOR FILM THICKNESS ESTIMATION METHOD, AND ESTIMATION PROGRAM

Japanese Patent Application No. 2016-222263 filed on Nov. 15, 2016, including description, claims, drawings, and abstract the entire disclosure is incorporated herein by reference in its entirety.

BACKGROUND

The present disclosure relates to a technique for estimating the film thickness of a photoconductor included in an image forming apparatus.

Technological Field

Image forming apparatuses such as MFPs (Multi-Functional Peripherals) have been widespread. An electrophotographic image forming apparatus executes, as a print process, the step of charging a photoconductor with a charging roller, the step of exposing the photoconductor in accordance with an image pattern under a print instruction, and the step of developing an electrostatic latent image formed by the exposure as a toner image.

The photoconductor has its surface worn when used. When the film thickness on the surface of the photoconductor is reduced, a print failure occurs. Therefore, the user needs to periodically replace photoconductors. To grasp the replacement timing of photoconductors, it is important to accurately detect the film thickness of the photoconductor. In recent years, various techniques for estimating the film thickness of the photoconductor have been developed.

Description of the Related Art

An example of the techniques for estimating the film thickness will be described. As described above, the photoconductor is charged by the charging roller. When the film thickness of the photoconductor is reduced, current flowing through the charging roller when voltage is applied to the charging roller (hereinafter may be referred to as "charging current") changes. That is, the magnitude of charging current correlates with the film thickness of the photoconductor. In view of this point, the image forming apparatus detects charging current and estimates the film thickness of the photoconductor based on the magnitude of charging current. Such a method of estimating the film thickness based on charging current is disclosed, for example, in Japanese Laid-Open Patent Publication No. 2015-148789, Japanese Laid-Open Patent Publication No. 2008-107571, and Japanese Laid-Open Patent Publication No. 2011-28102.

The charging current varies depending on the environment including temperature and humidity. Therefore, in a state in which charging current is not stable, the film thickness of the photoconductor may not be accurately estimated. Such a problem is particularly conspicuous under an environment in which temperature and humidity severely change. Then, there is a demand for techniques for accurately estimating the film thickness of the photoconductor.

SUMMARY

To achieve at least one of the abovementioned objects, according to an aspect of the present invention, an image forming apparatus reflecting one aspect of the present invention comprises a photoconductor, a charging roller for charging the photoconductor, a current sensor for detecting a value of current flowing through the photoconductor or the charging roller as a result of application of voltage to the charging roller, an acquisition sensor for acquiring an environment value representing an environment state inside the image forming apparatus, and a processor configured to estimate a film thickness of the photoconductor, based on the value of current detected by the current sensor when a state in which the environment value falls within a predetermined range continues for a predetermined time or longer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 11 is a diagram showing a table that defines the relation between temperature and predetermined range according to a third embodiment.

FIG. 13 is a diagram showing a table that defines the relation between temperature range, predetermined range, humidity range, and predetermined time according to a fifth embodiment.

FIG. 16 is a diagram showing a table that defines the correlation between charging current and the film thickness of the photoconductor for each temperature and humidity according to an eighth embodiment.

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts and components are denoted by the same reference signs. The names and functions thereof are also the same. Therefore, a detailed description thereof will not be repeated. It is noted that the embodiments and modifications described below may be selectively combined as appropriate.

First Embodiment

[Image Forming Apparatus 100]

Figure 1:
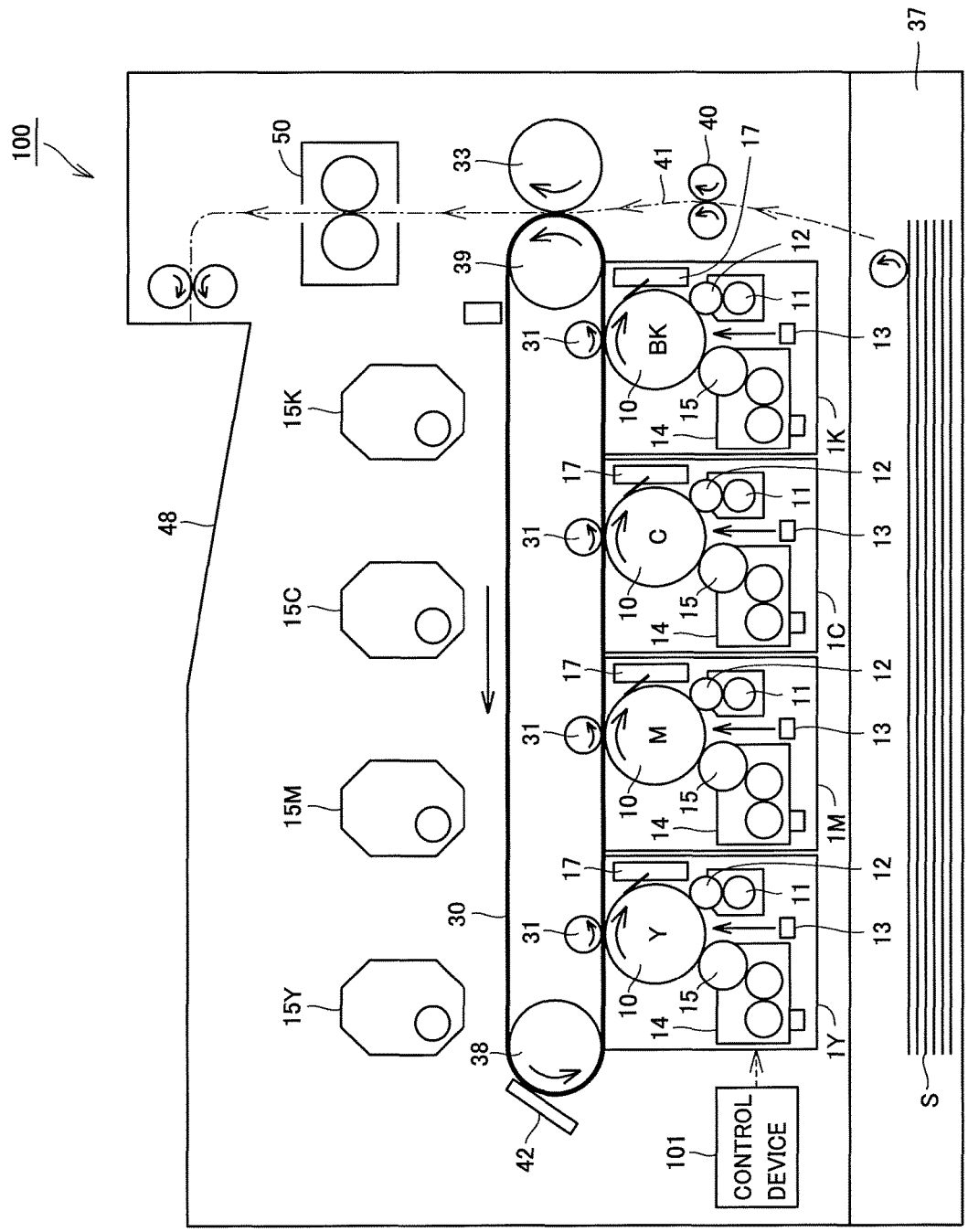
FIG. 1 is a diagram showing an example of the internal structure of an image forming apparatus according to a first embodiment.

Referring to FIG. 1, an image forming apparatus 100 according to the present embodiment will be described. FIG. 1 is a diagram showing an example of the internal structure of image forming apparatus 100.

FIG. 1 shows image forming apparatus 100 as a color printer. Although image forming apparatus 100 as a color printer will be described below, image forming apparatus 100 is not limited to a color printer. For example, image forming apparatus 100 may be a monochrome printer, or may be a facsimile machine, or may be an MFP (Multi-Functional Peripheral) including a monochrome printer, a color printer, and a facsimile machine.

Image forming apparatus 100 includes image forming units 1Y, 1M, 1C, 1K, removable toner bottles 15Y, 15M, 15C, 15K, an intermediate transfer belt 30, a primary transfer roller 31, a secondary transfer roller 33, a cassette 37, a driven roller 38, a driving roller 39, a timing roller 40, a cleaning device 42, a fixing device 50, and a control device 101.

Image forming unit 1Y is supplied with toner from toner bottle 15Y to form a toner image of yellow (Y) on photoconductor 10. Image forming unit 1M is supplied with toner from toner bottle 15M to form a toner image of magenta (M) on photoconductor 10. Image forming unit 1C is supplied with toner from toner bottle 15C to form a toner image of cyan (C) on photoconductor 10. Image forming unit 1K is supplied with toner from toner bottle 15K to form a toner image of black (BK) on photoconductor 10.

Image forming units 1Y, 1M, 1C, 1K are disposed along intermediate transfer belt 30 in order in the rotation direction of intermediate transfer belt 30. Image forming units 1Y, 1M, 1C, 1K each include a photoconductor 10 configured to be rotatable, a charging device 11, an exposure device 13, a development device 14, and a cleaning device 17.

Charging device 11 includes a rotatable charging roller 12. Charging roller 12 abuts on photoconductor 10. Charging roller 12 uniformly charges the surface of photoconductor 10 to a predetermined potential.

Exposure device 13 applies laser light to photoconductor 10 in accordance with a control signal from control device 101 and exposes the surface of photoconductor 10 in accordance with an input image pattern. An electrostatic latent image corresponding to the input image is thus formed on photoconductor 10.

Development device 14 develops the electrostatic latent image formed on photoconductor 10 as a toner image. More specifically, development device 14 applies development bias to development roller 15 while rotating development roller 15 to allow toner to adhere to the surface of development roller 15. The toner is transferred from development roller 15 to photoconductor 10, and a toner image corresponding to the electrostatic latent image is developed on the surface of photoconductor 10.

Photoconductor 10 and intermediate transfer belt 30 are in contact with each other at a section where primary transfer roller 31 is provided. Transfer voltage of polarity opposite to that of the toner image is applied to primary transfer roller 31 whereby the toner image is transferred from photoconductor 10 to intermediate transfer belt 30. The toner image of yellow (Y), the toner image of magenta (M), the toner image of cyan (C), and the toner image of black (BK) are superimposed in order and transferred from photoconductor 10 to intermediate transfer belt 30. A color toner image is thus formed on intermediate transfer belt 30.

Intermediate transfer belt 30 is stretched around driven roller 38 and driving roller 39. Driving roller 39 is connected to a motor (not shown). Control device 101 controls the motor so that driving roller 39 rotates. Intermediate transfer belt 30 and driven roller 38 rotate in conjunction with driving roller 39. The toner image on intermediate transfer belt 30 is thus sent to secondary transfer roller 33.

Cleaning device 17 collects toner left on the surface of photoconductor 10 after transfer of the toner image from photoconductor 10 to intermediate transfer belt 30.

Paper S is set in cassette 37. Paper S is sent sheet by sheet from cassette 37 to secondary transfer roller 33 by timing roller 40 along a conveyance path 41. Control device 101 controls transfer voltage to be applied to secondary transfer roller 33 in synchronization with the timing at which paper S is fed.

Secondary transfer roller 33 applies transfer voltage of polarity opposite to that of the toner image to paper S being conveyed. The toner image is thus attracted from intermediate transfer belt 30 to secondary transfer roller 33, so that the toner image on intermediate transfer belt 30 is transferred. The conveyance timing of paper S to secondary transfer roller 33 is controlled by timing roller 40 in agreement with the position of the toner image on intermediate transfer belt 30. As a result, the toner image on intermediate transfer belt 30 is transferred to an appropriate position on paper S.

Fixing device 50 presses and heats paper S passing through fixing device 50. The toner image is thus fixed on paper S. Paper S is thereafter discharged to a tray 48.

Cleaning device 42 collects toner left on the surface of intermediate transfer belt 30 after transfer of the toner image from intermediate transfer belt 30 to paper S. The collected toner is conveyed by a conveyance screw (not shown) and stored in a toner waste container (not shown).

[Method of Estimating Film Thickness of Photoconductor 10]

Referring to FIG. 2 to FIG. 5, a method of estimating the film thickness of photoconductor 10 will be described.

Figure 2:
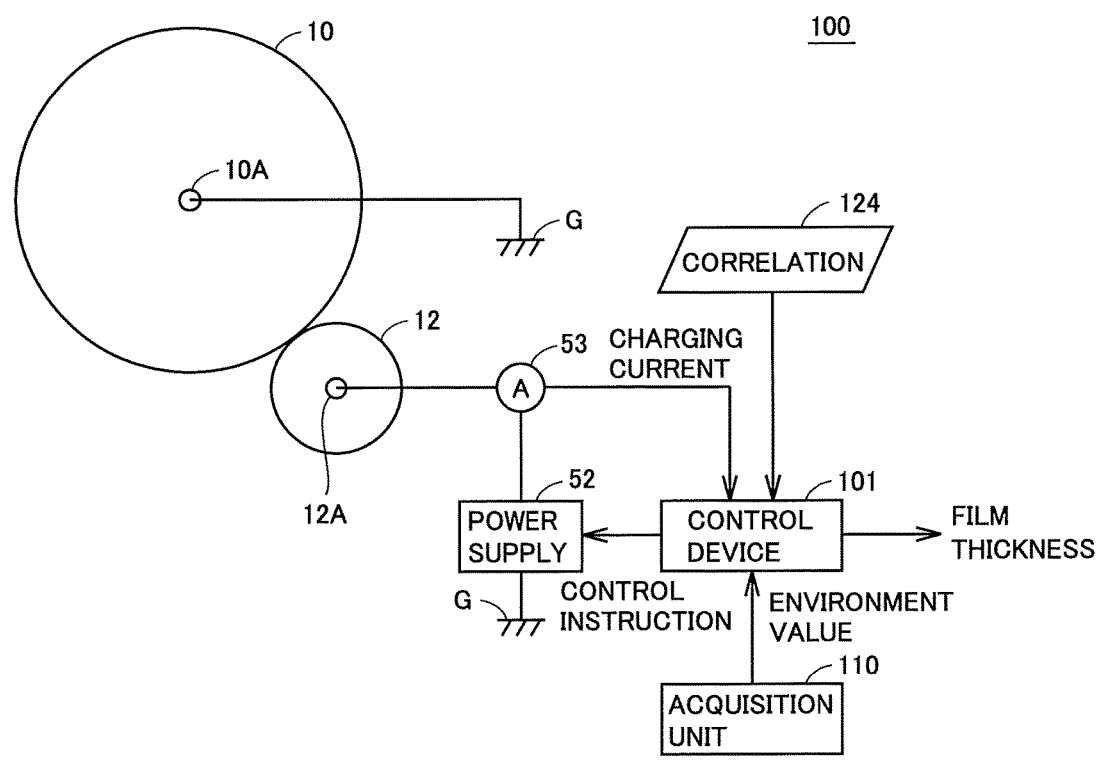
FIG. 2 is a diagram showing an example of the configuration necessary for estimating the film thickness of a photoconductor.
Figure 3:
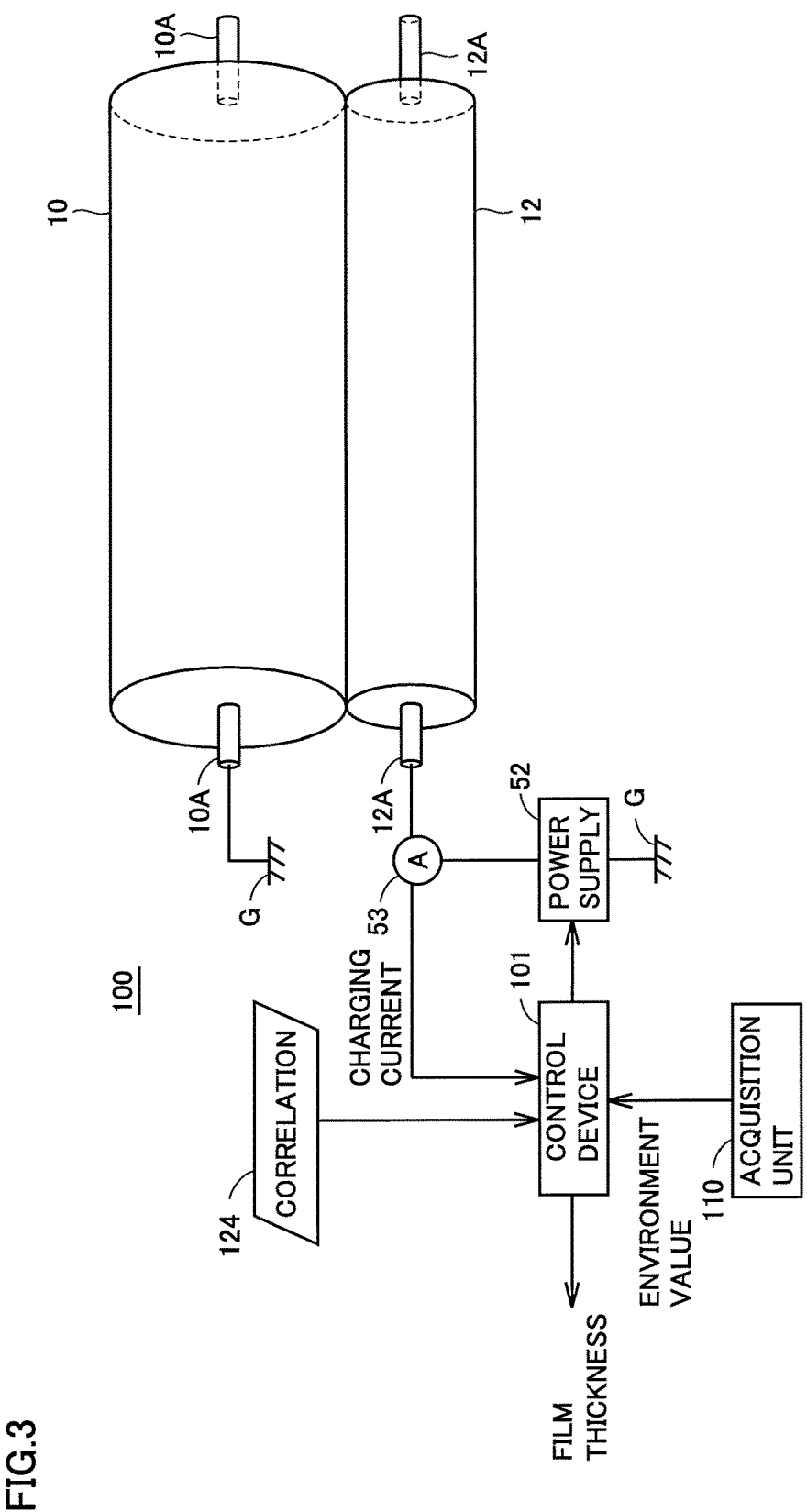
FIG. 3 is a diagram showing an example of the configuration necessary for estimating the film thickness of a photoconductor.

FIG. 2 and FIG. 3 are diagrams showing an example of the configuration necessary for estimating the film thickness of photoconductor 10. In FIG. 2 and FIG. 3, photoconductor 10 and charging roller 12 are shown from different directions.

As shown in FIG. 2 and FIG. 3, photoconductor 10 abuts on charging roller 12. In the inside of photoconductor 10, a conductive core 10A is provided. Core 10A is connected to the ground G. In the inside of charging roller 12, a conductive core 12A is provided. A power supply 52, a current sensor 53, and the ground G are connected in series to core 12A.

Power supply 52 supplies charging roller 12 with, for example, voltage obtained by superimposing AC (Alternative Current) voltage on DC (Direct Current) voltage. Voltage applied from power supply 52 to charging roller 12 causes a potential difference between core 12A of charging roller 12 and core 10A of photoconductor 10. As a result, discharge occurs between charging roller 12 and photoconductor 10, and charging current flows through charging roller 12 and photoconductor 10. Charging current flows from power supply 52 through current sensor 53, charging roller 12, photoconductor 10, and the ground G in this order.

Current sensor 53 is, for example, a current sensor for detecting the value of current flowing itself. Current sensor 53 detects the value of current flowing through photoconductor 10 or charging roller 12 by applying voltage to charging roller 12. The value of the detected charging current is output to control device 101.

Figure 4:
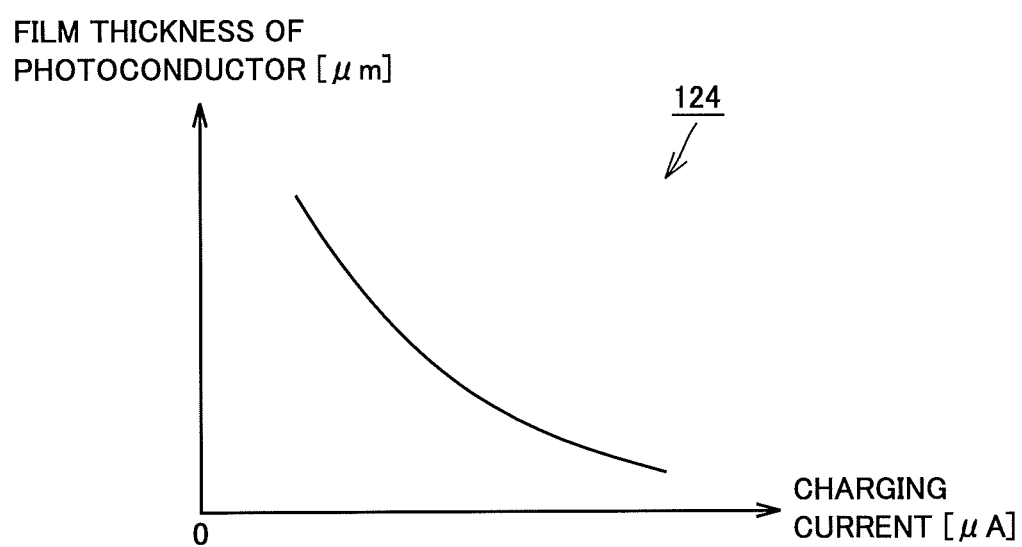
FIG. 4 is a diagram showing an example of the correlation between charging current and the film thickness of the photoconductor.

Control device 101 estimates the film thickness of photoconductor 10 by referring to correlation 124 that defines the relation between the value of charging current and the film thickness of photoconductor 10. FIG. 4 is a diagram showing an example of correlation 124. As shown in FIG. 4, in correlation 124, the film thickness of photoconductor 10 for the value of charging current is defined. Correlation 124 may be represented by a table that defines the film thickness for each range of charging current, or may be represented by a relational expression including the value of charging current as an explanatory variable and the film thickness as a response variable. Control device 101 refers to correlation 124 to specify the film thickness corresponding to the value of charging current detected by current sensor 53 and estimates the film thickness as the present film thickness of photoconductor 10.

The value of charging current for use in estimation of the film thickness varies depending on the environment including temperature and humidity. In an environment in which charging current is not stable, the film thickness of photoconductor 10 that is output as the estimation result changes, although the film thickness itself does not actually change. Then, image forming apparatus 100 according to the present embodiment estimates the film thickness of photoconductor 10 based on charging current detected under a stable environment.

More specifically, in the inside of image forming apparatus 100, an acquisition sensor 110 is provided for acquiring an environment value indicating the environment state in the apparatus. The environment value is represented by, for example, the temperature inside image forming apparatus 100, the humidity inside image forming apparatus 100, the atmospheric pressure at an installation place for image forming apparatus 100, or other indicators that affect charging current. Acquisition sensor 110 periodically acquires the environment value and outputs the acquired environment value to control device 101.

Control device 101 acquires charging current from current sensor 53 when a state in which the environment value acquired by acquisition sensor 110 falls within a predetermined range continues for a predetermined time or longer. Control device 101 estimates the film thickness of photoconductor 10 based on the acquired charging current. The film thickness of photoconductor 10 is estimated based on the charging current detected in a situation in which the environment is stable, whereby the film thickness of photoconductor 10 is accurately estimated. As a result, it becomes unnecessary to estimate the film thickness of photoconductor 10 many times, thereby reducing the number of times of the film thickness estimating process. This can suppress unnecessary rotation of photoconductor 10 and suppress wear of photoconductor 10.

Figure 5:
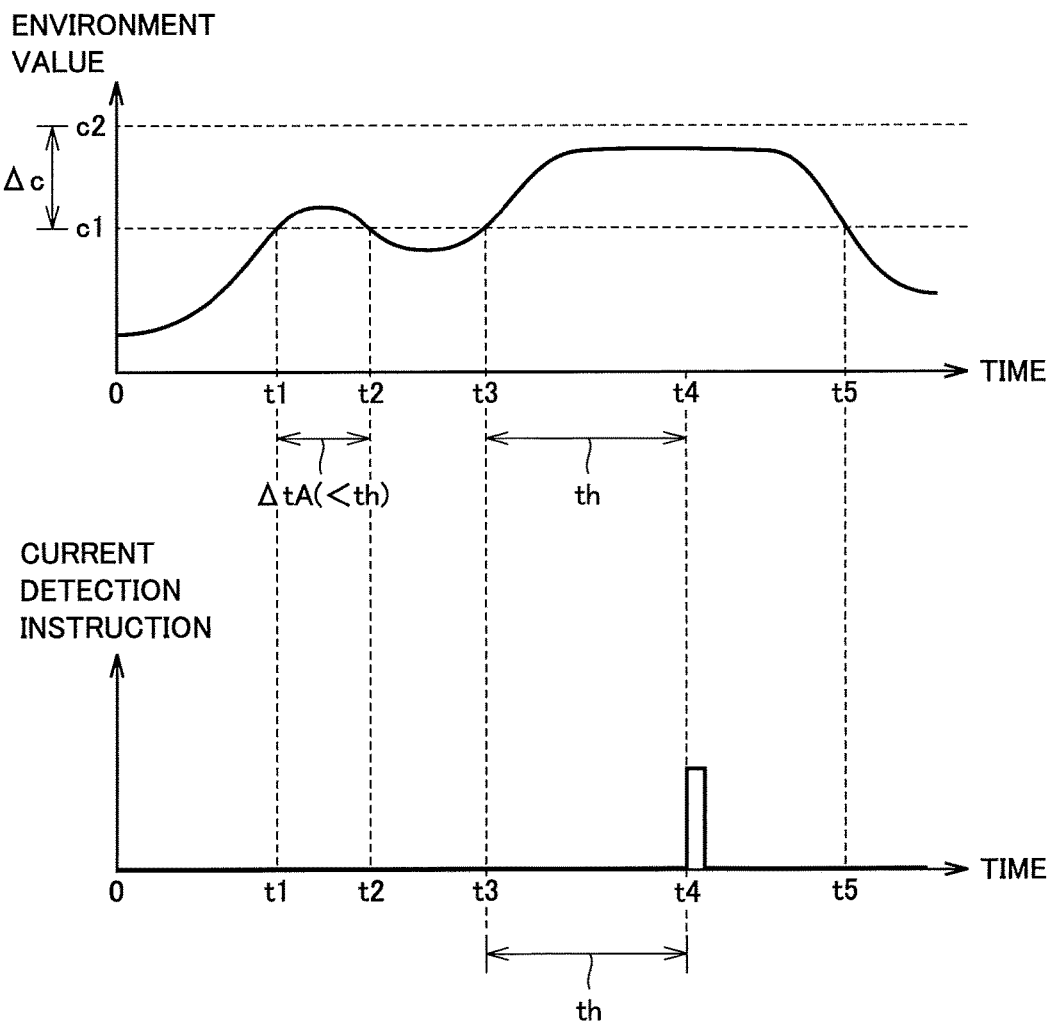
FIG. 5 is a diagram showing an example of transition of an environment value.

Referring to FIG. 5, the timing of detecting charging current will be described in more detail. FIG. 5 is a diagram showing an example of transition of the environment value acquired by acquisition sensor 110.

A predetermined range $\Delta c$ indicating the reference of a stable environment is set in image forming apparatus 100. The predetermined range $\Delta c$ may be set in advance during design or may be set as desired by, for example, technicians in the field. The predetermined range $\Delta c$ is defined by at least one of a lower limit value c1 and an upper limit value c2. That is, the predetermined range $\Delta c$ may be defined only by the lower limit value c1, or may be defined only by the upper limit value c2, or may be defined both the lower limit value c1 and the upper limit value c2.

At time t1, it is assumed that the environment value exceeds the lower limit value c1. Here, control device 101 starts measuring time.

At time t2, it is assumed that the environment value falls below the lower limit value c1. Here, control device 101 stops measuring time. Control device 101 determines whether time $\Delta tA$ obtained as a measurement result continues for a predetermined time th or longer. That is, control device 101 determines whether a state in which the environment value falls within the predetermined range $\Delta c$ continues for a predetermined time th or longer. The predetermined time th may be set in advance or may be set as desired, for example, by technicians in the field.

In the example in FIG. 5, since time $\Delta tA$ is shorter than the predetermined time th, control device 101 determines that a state in which the environment value falls within the predetermined range $\Delta c$ does not continue for the predetermined time th or longer. In this case, control device 101 determines that the environment inside image forming apparatus 100 is not stable, and does not detect charging current.

At time t4, it is assumed that a state in which the environment value falls within the predetermined range $\Delta c$ continues for the predetermined time th or longer. Here, control device 101 determines that the environment inside image forming apparatus 100 has become stable, and outputs an instruction to detect charging current to current sensor 53. Charging current is thus detected under a stable environment. Control device 101 estimates the film thickness of photoconductor 10 based on the charging current detected under a stable environment.

It is noted that the timing of detecting charging current for use in the film thickness estimating process is not limited to the timing at which a state in which the environment value falls within the predetermined range $\Delta c$ continues for the predetermined time th (that is, time t4), as long as detection is performed from time t4 to time t5. That is, charging current for use in the film thickness estimating process may be detected at any timing after a state in which the environment value falls within the predetermined range $\Delta c$ continues for the predetermined time th or longer and if the environment value falls within the predetermined range $\Delta c$.

As long as charging current detected under a stable environment is used for the film thickness estimating process, the estimating process is executed at any timing after the charging current is detected. That is, the film thickness estimating process is executed at any timing after time t4.

[Functional Configuration of Image Forming Apparatus 100]

Figure 6:
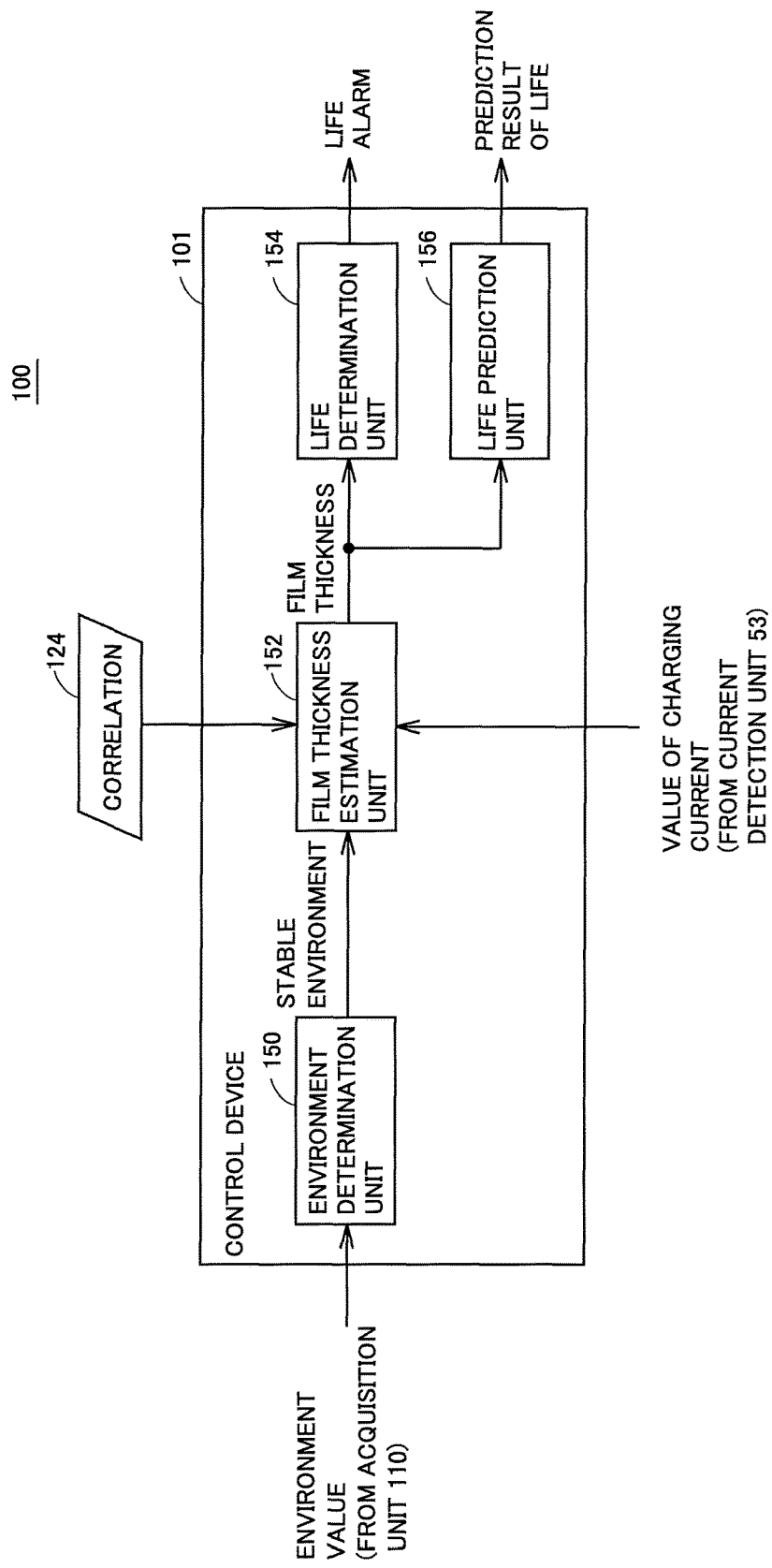
FIG. 6 is a diagram showing an example of the functional configuration of the image forming apparatus according to the first embodiment.
Figure 7:
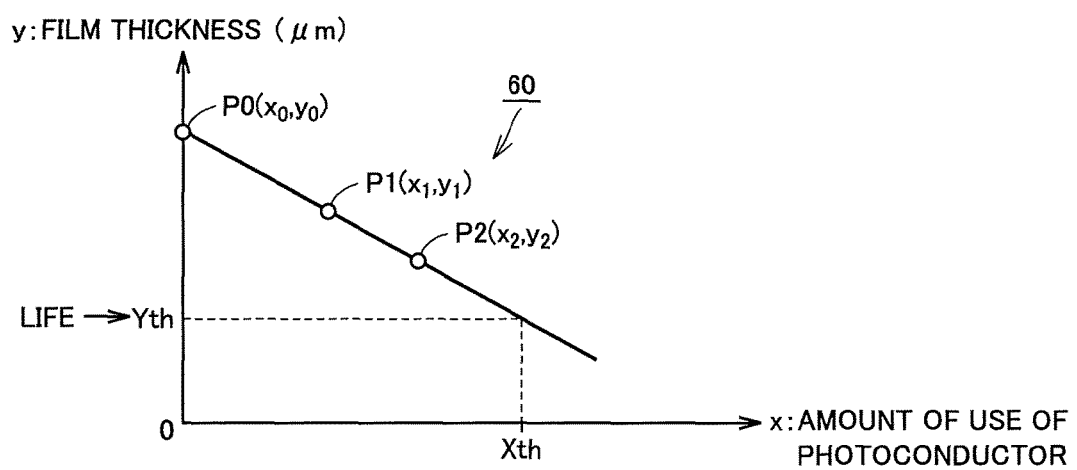
FIG. 7 is a diagram showing the relation between the amount of use of the photoconductor and the film thickness of the photoconductor according to the first embodiment.

Referring to FIG. 6 and FIG. 7, the functions of image forming apparatus 100 will be described.

FIG. 6 is a diagram showing an example of the functional configuration of image forming apparatus 100. As shown in FIG. 6, control device 101 of image forming apparatus 100 includes, as a functional configuration, an environment determination unit 150, a film thickness estimation unit 152, a life determination unit 154, and a life prediction unit 156.

Environment determination unit 150 determines whether a state in which the environment value output from the above-noted acquisition sensor 110 (see FIGS. 2 and 3) falls within a predetermined range continues for a predetermined time or longer. When it is determined that a state in which the environment value falls within a predetermined range continues for a predetermined time or longer, environment determination unit 150 determines that a stability condition indicating that the environment inside image forming apparatus 100 is stable is satisfied.

When environment determination unit 150 determines that the above-noted stability condition is satisfied, film thickness estimation unit 152 outputs a current detection instruction to the above-noted current sensor 53 (see FIGS. 2 and 3) to acquire the value of charging current from current sensor 53. Film thickness estimation unit 152 estimates the film thickness of photoconductor 10 based on the acquired value of charging current. The method of estimating the film thickness is as explained in FIG. 4 and will not be further elaborated. The estimated film thickness is output to each of life determination unit 154 and life prediction unit 156.

Life determination unit 154 determines whether the film thickness estimated by film thickness estimation unit 152 falls below a predetermined value. If the estimated film thickness falls below a predetermined value, life determination unit 154 determines that photoconductor 10 reaches the end of life. The film thickness estimated accurately is used for determination of the life of photoconductor 10 whereby life determination unit 154 can accurately determine whether photoconductor 10 reaches the end of life.

If it is determined that photoconductor 10 reaches the end of life, life determination unit 154 outputs an alarm as such. For example, users or technicians in the field are notified of this alarm. This notification is implemented, for example, by transmitting an alarm mail, displaying an alarm screen, or outputting alarm sound. Users or technicians in the field, notified that photoconductor 10 reaches the end of life, can grasp that it is necessary to replace photoconductor 10.

Life prediction unit 156 calculates the reduction rate of the film thickness of photoconductor 10 based on the amount of change in film thickness of photoconductor 10 and the amount of use of photoconductor 10 at the point of time when the film thickness is estimated, and predicts the life of photoconductor 10 based on the reduction rate. Referring to FIG. 7, the function of life prediction unit 156 will be described.

FIG. 7 is a diagram showing the relation between the amount of use of photoconductor 10 and the film thickness of photoconductor 10. FIG. 7 shows a graph 60. The horizontal axis of graph 60 represents the amount of use of photoconductor 10. The amount of use of photoconductor 10 is represented by, for example, the number of times of rotation of photoconductor 10 up to the present or the use time (rotation time) up to the present. The vertical axis of graph 60 represents the film thickness of photoconductor 10.

Point P0 on graph 60 shows the initial film thickness of photoconductor 10 when photoconductor 10 is unused (for example, when photoconductor 10 is replaced). Point P0 is expressed by the amount of use "$x_0$" and the initial film thickness "$y_0$". Typically, the amount of use "$x_0$" at point P0 is "0". The initial film thickness "$y_0$" may be preset or may be estimated by film thickness estimation unit 152 when photoconductor 10 is unused. Points P1, P2 on graph 60 show the film thickness of photoconductor 10 estimated by film thickness estimation unit 152. Point P1 is represented by the amount of use "$x_1$" and the film thickness "$y_1$". Point P2 is represented by the amount of use "$x_2$" and the film thickness "$y_2$".

Life prediction unit 156 calculates the transition of the film thickness of photoconductor 10 from at least two points among points P0 to P2. For example, when points P0, P1 are known, the transition of the film thickness is calculated by a linear equation of Equation (1).

$$y - y_0 = (y_1 - y_0)/(x_1 - x_0)(x - x_1) \quad (1)$$

In Equation (1), "$y_1 - y_0$" is the amount of change of the film thickness. In Equation (1), "$(y_1 - y_0)/(x_1 - x_0)$" is the amount of reduction of the film thickness per predetermined amount of use (that is, the reduction rate of the film thickness) and is equivalent to the slope of graph 60.

When points P1, P2 are known, the transition of the film thickness is calculated by a linear equation of Equation (2) below.

$$y - y_1 = (y_1 - y_1)/(x_2 - x_1)(x - x_2) \quad (2)$$

In Equation (2), "$y_2 - y_1$" is the amount of change in film thickness. In Equation (2), "$(y_2 - y_1)/(x_2 - x_1)$" is the amount of reduction of the film thickness per predetermined amount of use (that is, the reduction rate of the film thickness) and is equivalent to the slope of graph 60.

Life prediction unit 156 calculates "$x = X_{th}$" by substituting the film thickness "$y_{th}$" indicating the life of photoconductor 10 into "y" of Equation (1) or Equation (2). The calculated "$X_{th}$" represents the amount of use at which photoconductor 10 reaches the end of life. The amount of use "$X_{th}$" at which the end of life is reached is calculated whereby the remaining usable amount is calculated. The life of photoconductor 10 is thus predicted. The life of photoconductor 10 is predicted from the accurately estimated film thickness, whereby image forming apparatus 100 can also accurately predict the life of photoconductor 10.

Users or technicians in the field are notified of the predicted life. Users or technicians in the field, notified of the life of photoconductor 10, can accurately grasp the replacement timing of photoconductor 10.

Preferably, life prediction unit 156 predicts the timing at which photoconductor 10 reaches the end of life. As an example, life prediction unit 156 calculates the timing at which photoconductor 10 reaches the end of life by dividing the remaining usable amount of photoconductor 10 by the pace of use (rate of use). The pace of use can be obtained from the use history of photoconductor 10.

Further preferably, life prediction unit 156 calculates the rate of wear of photoconductor 10. The rate of wear is calculated, for example, by Equation (3) below.

$$m = v \cdot X/(y_0 - Y_{th}) \cdot 100 \quad (3)$$

In Equation (3), "m" is the rate of wear of photoconductor 10. "v" is the reduction rate of the film thickness of photoconductor 10. "X" is the amount of use of photoconductor 10 from the time when photoconductor 10 is unused up to the present. "$y_0$" is the film thickness of photoconductor 10 when it is unused. "$Y_{th}$" is the film thickness serving as a reference of the life of photoconductor 10.

Although the transition of the film thickness of photoconductor 10 is calculated based on points P0, P1 or points P1, P2 in the example described above, the transition of the film thickness of photoconductor 10 may be calculated based on the average of point P0 and points P1, P2. Life prediction unit 156 can predict the life of photoconductor 10 even more accurately by using the average of a plurality of estimated film thicknesses.

Although the transition of the film thickness of photoconductor 10 is calculated by a linear equation in the example described above, the transition of the film thickness of photoconductor 10 may be calculated by any other approximation equations.

Furthermore, although the estimated film thickness is used for determination of the life of photoconductor 10 in the example described above, the estimated film thickness may be used for other applications. For example, the estimated film thickness is collected from a variety of image forming apparatuses 100 and complied into a database. Here, the estimated film thickness is associated with an environment value such as temperature and humidity to be complied into a database to allow designers to analyze the cause of wear of photoconductor 10. The designers can improve photoconductor 10 based on the findings obtained as a result of analysis.

[Control Structure of Image Forming Apparatus 100]

Figure 8:
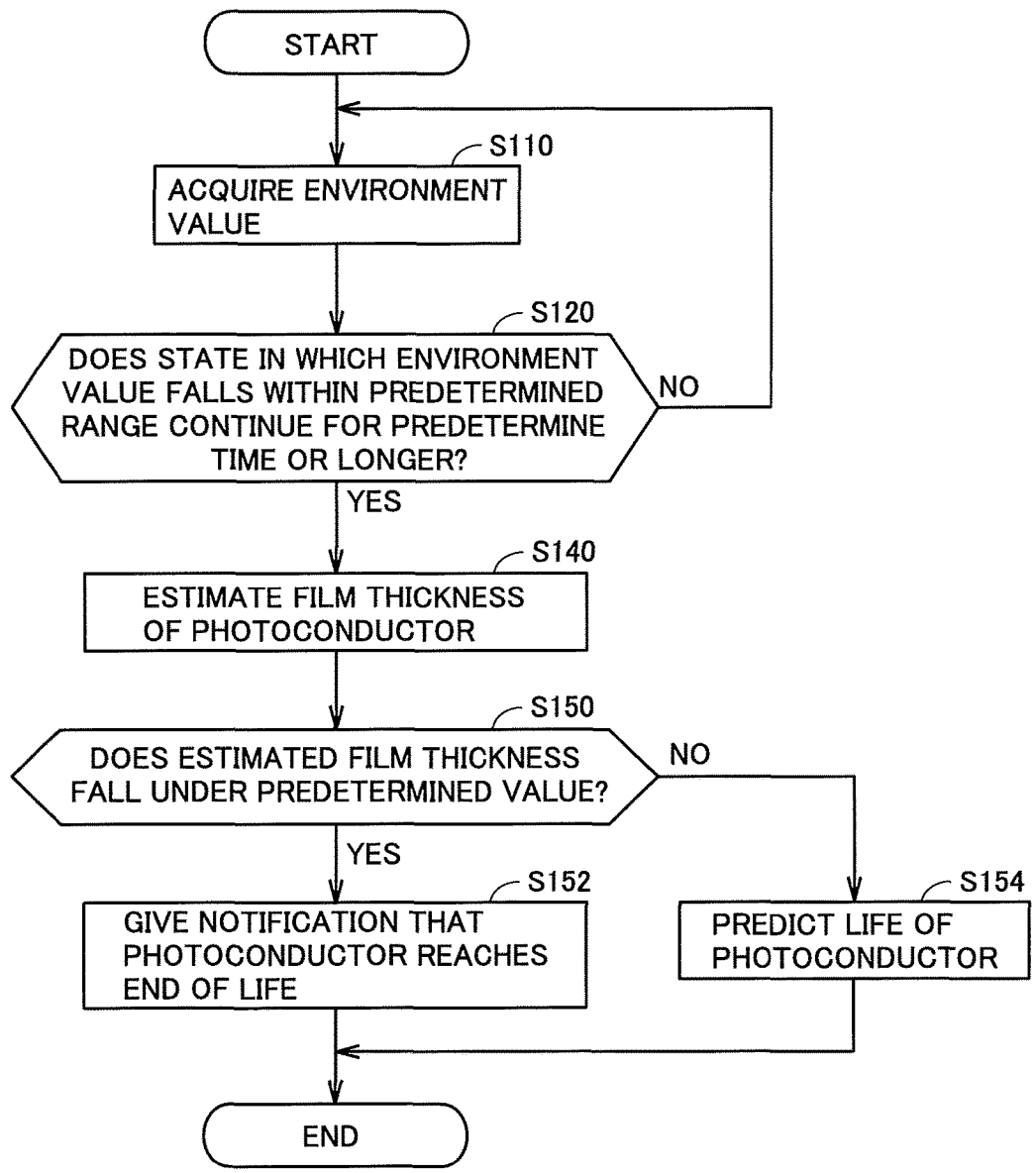
FIG. 8 is a flowchart illustrating part of the process executed by the image forming apparatus according to the first embodiment.

Referring to FIG. 8, the control structure of image forming apparatus 100 will be described. FIG. 8 is a flowchart illustrating part of the process executed by image forming apparatus 100. The process in FIG. 8 is implemented by control device 101 of image forming apparatus 100 executing a program. In another aspect, part or the whole of the process may be executed by circuit elements or other hardware.

In step S110, control device 101 acquires the environment value representing an environment state inside image forming apparatus 100 from the above-noted acquisition sensor 110 (see FIG. 2, FIG. 3). The environment value is represented, for example, by the temperature inside image forming apparatus 100, the humidity inside image forming apparatus 100, the atmospheric pressure at an installation place for image forming apparatus 100, or other indicators that affect charging current.

In step S120, control device 101 serves as the above-noted environment determination unit 150 (see FIG. 6) to determine whether the state in which the environment value acquired in step S110 falls within a predetermined range continues for a predetermined time or longer.

In one aspect, control device 101 starts measuring time based on that the environment value falls within a predetermined range. While the environment value falls within a predetermined range, the measurement of time is continued. If the environment value falls out of a predetermined range, the measurement of time is stopped, and the measured time is reset. If the measured time exceeds a predetermined time, control device 101 determines that the state in which the environment value falls within a predetermined range continues for a predetermined time or longer.

In another aspect, control device 101 determines that the state in which the environment value falls within a predetermined range continues for a predetermined time or longer, if the environment value acquired in step s110 and the environment value detected in a predetermined time in the past fall within a predetermined range.

If it is determined that the state in which the environment value falls within a predetermined range continues for a predetermined time or longer (YES in step S120), control device 101 switches the control to step S140. If not (NO in step S120), control device 101 returns the control to step S110.

In step S140, control device 101 serves as the above-noted film thickness estimation unit 152 (see FIG. 6) to output a current detection instruction to current sensor 53 (see FIGS. 2 and 3) and acquire the value of charging current from current sensor 53. Film thickness estimation unit 152 estimates the film thickness of photoconductor 10 based on the acquired value of charging current. The method of estimating the film thickness is as explained in FIG. 4 and will not be further elaborated.

In step S150, control device 101 serves as the above-noted life determination unit 154 (see FIG. 6) to determine whether the film thickness estimated in step S140 falls below a predetermined value. If it is determined that the film thickness estimated in step S140 falls below a predetermined value (YES in step S150), control device 101 switches the control to step S152. If not (NO in step S150), control device 101 switches the control to step S154.

In step S152, control device 101 gives a notification that photoconductor 10 reaches the end of life. The notification is implemented, for example, by transmitting an alarm mail, displaying an alarm screen, or outputting sound.

In step S154, control device 101 serves as the life prediction unit 156 (see FIG. 6) to calculate the reduction rate of the film thickness of photoconductor 10, based on the amount of change in the film thickness of photoconductor 10 and the amount of use of photoconductor 10 at the point of time of estimation of the film thickness, and predict the life of photoconductor 10 based on the reduction rate. The method of predicting the life of the photoconductor is as explained in FIG. 7 and will not be further elaborated. Control device 101 outputs the predicted life of photoconductor 10. The life may be output to any destination. As an example, the life may be transmitted to portable terminals of technicians in the field. The portable terminals display the life received from image forming apparatus 100 on the screen. The technicians in the field thus can grasp the replacement timing of photoconductor 10.

[Hardware Configuration of Image Forming Apparatus 100]

Figure 9:
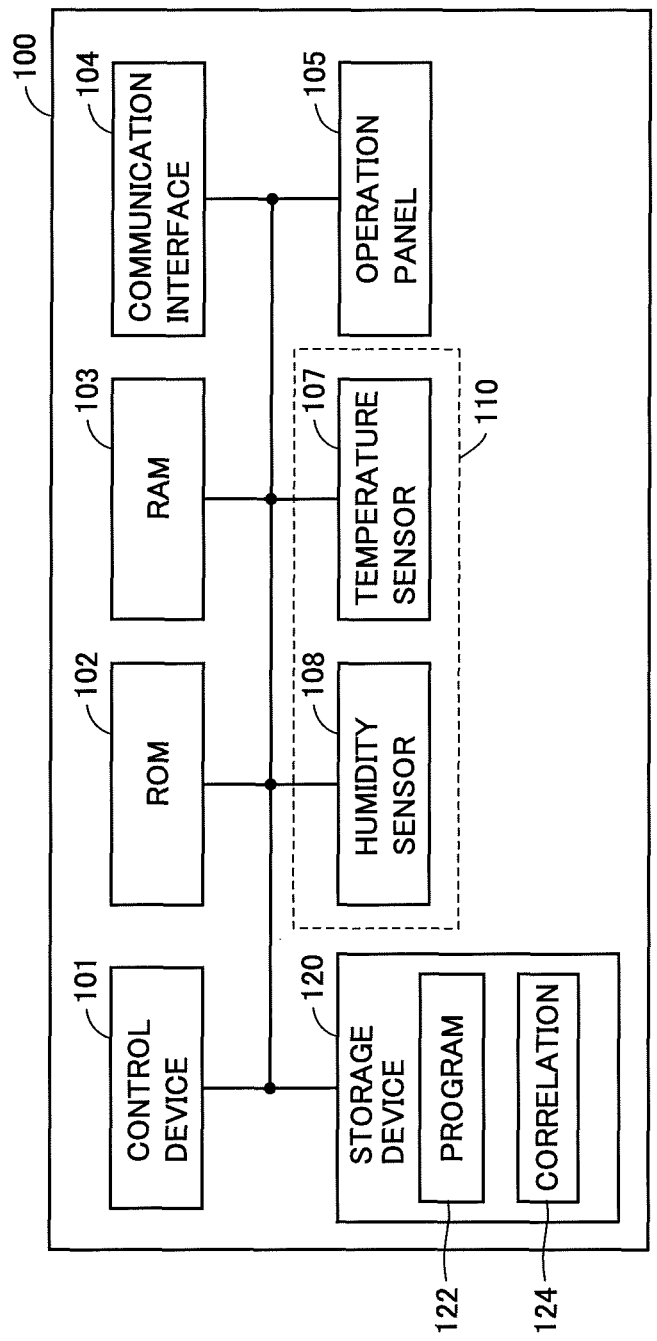
FIG. 9 is a block diagram showing the main hardware configuration of the image forming apparatus according to the first embodiment.

Referring to FIG. 9, an example of the hardware configuration of image forming apparatus 100 will be described. FIG. 9 is a block diagram showing a main hardware configuration of image forming apparatus 100.

As shown in FIG. 9, image forming apparatus 100 includes a control device 101, a ROM (Read Only Memory) 102, a RAM (Random Access Memory) 103, a communication interface 104, an operation panel 105, an acquisition sensor 110, and a storage device 120.

Control device 101 is configured with, for example, at least one integrated circuit. The integrated circuit is configured with, for example, at least one CPU (Central Processing Unit), at least one ASIC (Application Specific Integrated Circuit), at least one FPGA (Field Programmable Gate Array), or a combination thereof.

Control device 101 executes a variety of programs such as a program 122 for estimating the film thickness of photoconductor 10 to control the operation of image forming apparatus 100. Control device 101 reads program 122 from storage device 120 onto ROM 102 based on acceptance of an instruction to execute program 122. RAM 103 functions as a working memory to temporarily store a variety of data necessary for executing program 122.

Communication interface 104 is connected with, for example, an antenna (not shown). Image forming apparatus 100 exchanges data with external communication equipment through the antenna. Examples of the external communication equipment include portable communication terminals such as smartphones and servers. Image forming apparatus 100 may be configured to download program 122 from a server through the antenna.

Operation panel 105 includes a display and a touch panel. The display and the touch panel are superimposed on each other, and operation panel 105 accepts, for example, input of the setting values for estimating the film thickness of photoconductor 10. For example, operation panel 105 accepts the settings of the predetermined range $\Delta c$ (see FIG. 5) and the predetermined time th (see FIG. 5) described above. In addition, operation panel 105 displays an alarm screen for giving an alarm indicating that photoconductor 10 reaches the end of life or a timing at which photoconductor 10 reaches the end of life.

Acquisition sensor 110 acquires an environment value representing the environment state inside image forming apparatus 100. For example, acquisition sensor 110 includes a temperature sensor 107 for detecting the temperature inside image forming apparatus 100 as an environment value. In addition, acquisition sensor 110 includes a humidity sensor 108 for detecting the humidity inside image forming apparatus 100 (relative humidity or absolute humidity) as an environment value. Temperature sensor 107 and humidity sensor 108 may be configured integrally as a hygro-thermo sensor or may be configured individually. In addition, acquisition sensor 110 may include, for example, a barometric pressure sensor for detecting the atmospheric pressure at an installation place for image forming apparatus 100 as an environment value and a sensor for detecting other indicators that affect charging current.

Storage device 120 is, for example, a storage medium such as hard disk or external storage device. Storage device 120 stores, for example, program 122 according to the present embodiment and the above-noted correlation 124 (see FIG. 4). The storage location for program 122 and correlation 124 is not limited to storage device 120, and program 122 and correlation 124 may be stored, for example, in a storage area of control device 101 (for example, cache), ROM 102, RAM 103, or external equipment (for example, server).

Program 122 may be provided as a program built in part of any given program, rather than a single program. In this case, the control process according to the present embodiment is implemented in cooperation with any given program. Such a program that does not include part of modules does not depart from the scope of program 122 according to the present embodiment. Furthermore, part or the whole of the functions provided by program 122 may be implemented by dedicated hardware. Furthermore, image forming apparatus 100 may be configured in the form of cloud service such that at least one server executes part of the processes of program 122.

Summary of First Embodiment

As described above, image forming apparatus 100 according to the present embodiment detects charging current when the state in which the environment value falls within a predetermined range continues for a predetermined time or longer, and estimates the film thickness of photoconductor 10 based on the charging current. The film thickness of photoconductor 10 is estimated based on charging current detected under a situation in which the environment is stable, whereby the film thickness of photoconductor 10 is accurately estimated. As a result, it becomes unnecessary to estimate the film thickness of photoconductor 10 many times, thereby reducing the number of times of the film thickness estimating process. Thus, image forming apparatus 100 can suppress unnecessary rotation of photoconductor 10, thereby suppressing wear of photoconductor 10.

Second Embodiment

[Overview]

Image forming apparatus 100 according to the first embodiment estimates the film thickness of photoconductor 10 based on charging current. By contrast, image forming apparatus 100 according to a second embodiment estimates the film thickness of photoconductor 10 based on not only charging current but also temperature and humidity inside image forming apparatus 100.

In other respects, the configuration is the same as image forming apparatus 100 according to the first embodiment and will not be further elaborated below.

[Method of Estimating Film Thickness of Photoconductor 10]

Figure 10:
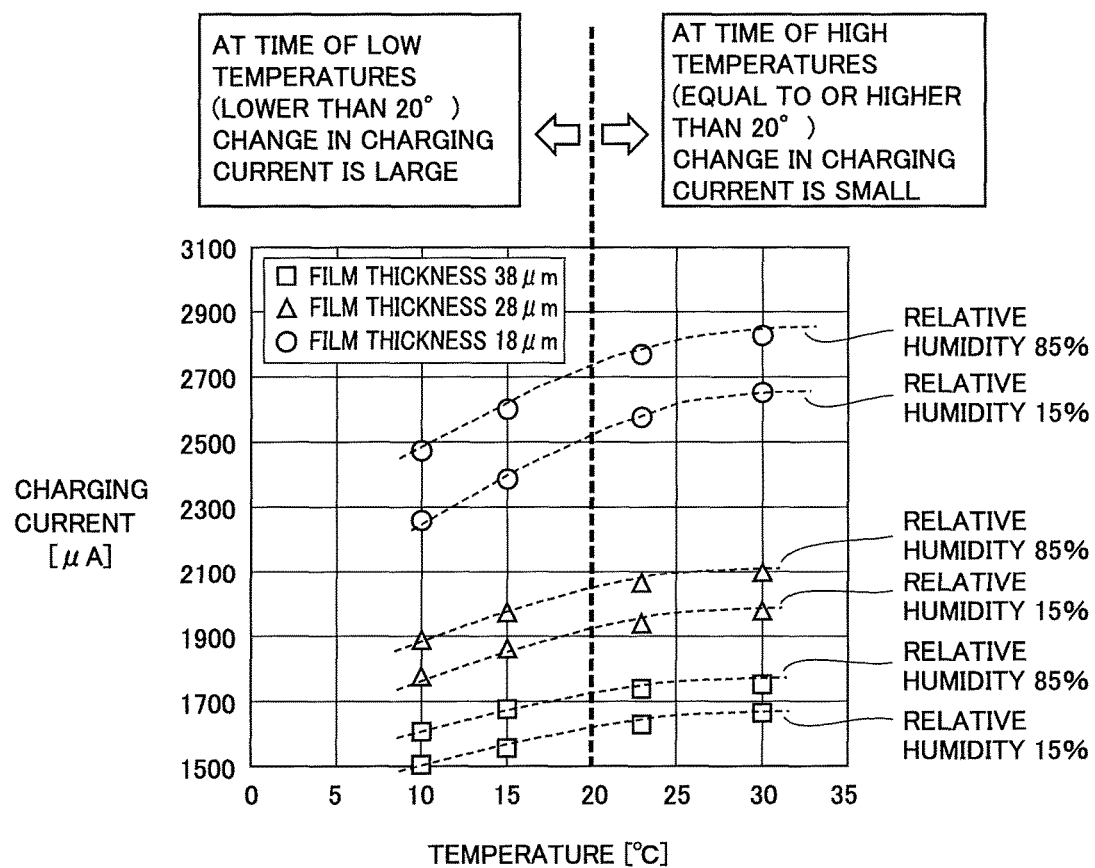
FIG. 10 is a diagram showing the relation between the film thickness of the photoconductor, the temperature inside the image forming apparatus, and the humidity inside the image forming apparatus according to a second embodiment.

Referring to FIG. 10, a method of estimating the film thickness of photoconductor 10 in the second embodiment will be described.

FIG. 10 is a diagram showing the relation between the film thickness of photoconductor 10, the temperature inside image forming apparatus 100, and the humidity inside image forming apparatus 100. As shown in FIG. 10, charging current varies in response to change in temperature and humidity. Therefore, charging current changes under an environment in which temperature and humidity change, and the film thickness of photoconductor 10 may not be estimated accurately. Then, control device 101 of image forming apparatus 100 estimates the film thickness of photoconductor 10 based on the value of charging current detected by current sensor 53 (see FIG. 2, FIG. 3), the temperature detected by temperature sensor 107 (see FIG. 9), and the humidity detected by humidity sensor 108 (see FIG. 9). The film thickness of photoconductor 10 is thus estimated even more accurately.

As an example, the correlation between charging current, temperature, humidity, and film thickness is defined in advance by experiments or the like. The correlation may be represented by a table that defines the film thickness for each range of charging current, for each range of temperature, and for each range of humidity, or may be represented by a relational expression including charging current, temperature, and humidity as explanatory variables and the film thickness as a response variable. Control device 101 refers to the correlation to specify the film thickness corresponding to the detected charging current, temperature, and humidity and estimates the specified film thickness as a film thickness of photoconductor 10 at present.

Although the film thickness of photoconductor 10 is estimated based on the correlation between charging current, temperature, humidity, and film thickness in the example described above, the film thickness of photoconductor 10 may be estimated based on the correlation between charging current, temperature, and film thickness, or the film thickness of photoconductor 10 may be estimated based on the correlation between charging current, humidity, and film thickness. That is, in estimation of the film thickness of photoconductor 10, it is not always necessary to use both temperature and humidity.

Summary of Second Embodiment

As described above, image forming apparatus 100 according to the present embodiment estimates the film thickness of photoconductor 10 using charging current and additionally using the temperature inside image forming apparatus 100 and the humidity inside image forming apparatus 100. The film thickness of photoconductor 10 is thus estimated even more accurately.

Third Embodiment

[Overview]

As described above, image forming apparatus 100 determines that the environment inside image forming apparatus 100 is stable when a state in which the environment value such as temperature falls within a predetermined range Δc (see FIG. 5) continues for a predetermined time. Here, in the first embodiment, the predetermined range Δc is fixed. However, as shown in FIG. 10 described above, since charging current changes easily as the temperature in image forming apparatus 100 decreases, the reliability of charging current is lower under a low temperature environment. Then, image forming apparatus 100 according to a third embodiment narrows the predetermined range Δc as the temperature inside the apparatus decreases. Accordingly, the condition for determining whether the environment is stable is stricter as the temperature in image forming apparatus 100 decreases. As a result, image forming apparatus 100 can estimate the film thickness of photoconductor 10 accurately even under a low temperature environment.

In other respects, the configuration is the same as image forming apparatus 100 according to the first to second embodiments and will not be further elaborated below.

[Method of Determining Predetermined Range Δc]

Referring to FIG. 11, a method of determining the predetermined range Δc of environment values indicating the reference of a stable environment will be described.

FIG. 11 is a diagram showing a table 126 that defines the relation between the temperature and the predetermined range Δc. In table 126, the predetermined range Δc is associated with each range of temperature. In the example of table 126 in FIG. 11, the lower the temperature is, the narrower the predetermined range Δc is. Table 126 is stored in advance, for example, in storage device 120 (see FIG. 9) of image forming apparatus 100, external equipment (for example, server), or any other storage medium.

Control device 101 of image forming apparatus 100 acquires the temperature from the above-noted temperature sensor 107 (see FIG. 9), based on that the timing of determining whether the environment inside the apparatus is stable has come. Control device 101 refers to table 126 to specify the predetermined range Δc corresponding to the detected temperature. Control device 101 thereafter determines whether the temperature detected for a predetermined time to the present falls within the predetermined range Δc. If it is determined that the temperature detected for a predetermined time to the present falls within the predetermined range Δc specified, control device 101 determines that the environment inside image forming apparatus 100 is stable, and outputs an instruction to detect charging current to current sensor 53 (see FIG. 2, FIG. 3). Charging current is thus detected under a stable environment. Control device 101 estimates the film thickness of photoconductor 10 based on the charging current detected under a stable environment.

The numerical values in table 126 shown in FIG. 11 are by way of example, and any numerical values may be set in table 126.

In the example in FIG. 11, the relation between the temperature and the predetermined range Δc is defined in the form of table 126. However, the relation between the temperature and the predetermined range Δc may be represented by a relational expression. In the relational expression, the temperature is expressed as an explanatory variable, and the predetermined range Δc is expressed as a response variable.

Summary of Third Embodiment

As described above, image forming apparatus 100 according to the present embodiment narrows the predetermined range Δc as the temperature inside the apparatus decreases. Thus, the condition for determining whether the environment is stable is stricter as the temperature inside image forming apparatus 100 decreases. As a result, image forming apparatus 100 can detect charging current accurately even under a low temperature environment and estimate the film thickness of photoconductor 10 accurately.

Fourth Embodiment

[Overview]

As described above, image forming apparatus 100 determines that the environment inside the apparatus is stable when a state in which the environment value such as temperature falls within a predetermined range Δc (see FIG. 5) continues for a predetermined time th (see FIG. 5) or longer. Here, in the first embodiment, the predetermined time th is fixed. By contrast, image forming apparatus 100 according to a fourth embodiment adjusts the predetermined time th depending on the temperature inside the apparatus.

In other respects, the configuration is the same as image forming apparatus 100 according to the first to third embodiments and will not be further elaborated below.

[Method of Determining Predetermined Time th]

Figure 12:
FIG. 12 is a diagram showing a table that defines the relation between temperature, predetermined range, and predetermined time according to a fourth embodiment.

Referring to FIG. 12, a method of determining the predetermined time th will be described.

FIG. 12 is a diagram showing a table 126A that defines the relation between temperature, the predetermined range Δc, and the predetermined time th. In table 126A, the predetermined range Δc and the predetermined time th are associated with each range of temperature. In the example of table 126A in FIG. 12, the lower the temperature is, the longer the predetermined time th is. Table 126A is stored, for example, in storage device 120 (see FIG. 9) of image forming apparatus 100, external equipment (for example, server), or any other storage medium.

Control device 101 of image forming apparatus 100 acquires the temperature from the above-noted temperature sensor 107 (see FIG. 9), based on that the timing of determining whether the environment inside the apparatus is stable has come. Control device 101 refers to table 126A to specify the predetermined range Δc and the predetermined time th corresponding to the detected temperature. Control device 101 determines whether the temperature detected for the predetermined time th to the present falls within the predetermined range Δc. If it is determined that the detected temperature for the predetermined time th to the present falls within the predetermined range Δc, control device 101 determines that the environment inside image forming apparatus 100 is stable, and outputs an instruction to detect charging current to current sensor 53 (see FIG. 2, FIG. 3). Charging current is thus detected under a stable environment. Control device 101 estimates the film thickness of photoconductor 10 based on the charging current detected under a stable environment.

In FIG. 12, an example in which the predetermined time th is changed for each temperature has been described. However, the predetermined time th may be fixed.

The numerical values in table 126A shown in FIG. 12 are by way of example, and any numerical values may be set in table 126A.

Summary of Fourth Embodiment

As described above, image forming apparatus 100 according to the present embodiment adjusts the predetermined time th depending on the temperature inside the apparatus. Thus, the condition indicating whether the environment has become stable is set for each temperature. Therefore, image forming apparatus 100 can detect charging current under a more stable environment. As a result, image forming apparatus 100 can estimate the film thickness of photoconductor 10 more accurately.

Fifth Embodiment

[Overview]

In the first embodiment, the example in which temperature is used as an indicator for determining whether the environment has become stable has mainly been described. By contrast, image forming apparatus 100 according to a fifth embodiment determines whether the environment is stable using not only temperature but also humidity.

In other respects, the configuration is the same as image forming apparatus 100 according to the first to fourth embodiments and will not be further elaborated below.

[Method of Determining Whether Environment is Stable]

Referring to FIG. 13, a method of determining whether the environment is stable will be described.

FIG. 13 is a diagram showing a table 126B that defines the relation between the temperature range, the predetermined range Δc, the humidity range Δd, and the predetermined time th. Table 126B is stored in advance, for example, in storage device 120 (see FIG. 9) of image forming apparatus 100, external equipment (for example, server), or any other storage medium.

Control device 101 of image forming apparatus 100 acquires the temperature from the above-noted temperature sensor 107 (see FIG. 9), based on that the timing of determining whether the environment inside the apparatus is stable has come. Control device 101 refers to table 126B to specify the predetermined range Δc, the humidity range Δd, and the predetermined time th corresponding to the detected temperature. Control device 101 thereafter determines whether the temperature detected by temperature sensor 107 falls within the predetermined range Δc for the predetermined time th to the present, and determines whether the humidity detected by humidity sensor 108 (see FIG. 9) falls within the predetermined range Δd for the predetermined time th to the present. If it is detected that the temperature detected by temperature sensor 107 falls within the predetermined range Δc for the predetermined time th to the present and it is detected that the humidity detected by humidity sensor 108 falls within the predetermined range Δd for the predetermined time th to the present, control device 101 determines that the environment inside image forming apparatus 100 is stable. In this case, control device 101 outputs an instruction to detect charging current to current sensor 53 (see FIG. 2, FIG. 3). Thus, charging current is detected under a more stable environment. Control device 101 estimates the film thickness of photoconductor 10 based on the charging current detected under a stable environment.

Summary of Fifth Embodiment

As described above, image forming apparatus 100 according to the present embodiment uses not only temperature but also humidity as indicators for determining whether the environment inside the apparatus is stable. Thus, image forming apparatus 100 can determine whether the environment inside the apparatus is stable more accurately, and can detect charging current under a more stable environment. Consequently, image forming apparatus 100 can estimate the film thickness of photoconductor 10 more accurately.

Sixth Embodiment

[Overview]

Image forming apparatus 100 according to the first embodiment determines that the environment inside the apparatus is stable when a state in which an environment value such as temperature falls within a predetermined range continues for a predetermined time or longer. By contrast, image forming apparatus 100 according to a sixth embodiment uses not only the environment value but also the number of print copies for a predetermined time in the past as indicators for determining whether the environment inside the apparatus is stable. The condition for determining whether the environment is stable is added whereby charging current can be detected under a more stable environment.

In other respects, the configuration is the same as image forming apparatus 100 according to the first to fifth embodiments and will not be further elaborated below.

[Control Structure of Image Forming Apparatus 100]

Figure 14:
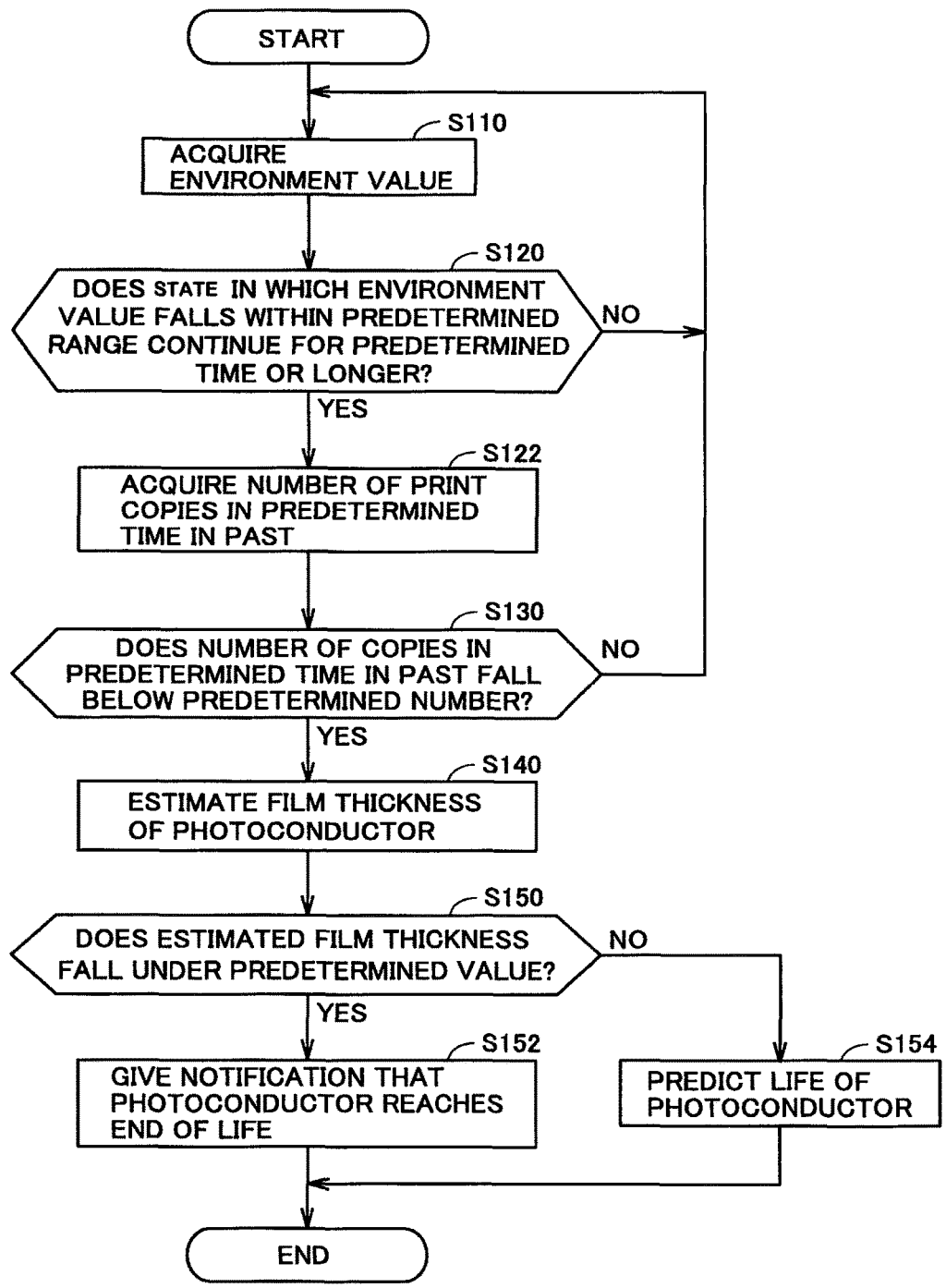
FIG. 14 is a flowchart illustrating part of the process executed by the image forming apparatus according to a sixth embodiment.

Referring to FIG. 14, the control structure of image forming apparatus 100 according to a sixth embodiment will be described. FIG. 14 is a flowchart illustrating part of the process executed by image forming apparatus 100 according to the sixth embodiment. The process in FIG. 14 is implemented by control device 101 of image forming apparatus 100 executing a program. In another aspect, part or the whole of the process may be executed by circuit elements or other hardware.

The process except for steps S122, S130 shown in FIG. 14 is as explained in FIG. 8 and will not be further elaborated.

In step S122, control device 101 acquires the number of print copies in a predetermined time in the past. The number of print copies is acquired, for example, from print history stored in image forming apparatus 100.

In step S130, control device 101 determines whether the number of print copies in a predetermined time in the past falls below a predetermined number. If it is determined the number of print copies in a predetermined time in the past falls below a predetermined number (YES in step S130), control device 101 switches the control to step S140. If not (NO in step S130), control device 101 returns the control to step S110.

Summary of Sixth Embodiment

As described above, image forming apparatus 100 according to the present embodiment determines whether the state in which the environment value falls within a predetermined range continues for a predetermined time or longer (the process in step S120), and additionally determines whether the number of print copies in a predetermined time in the past falls below a predetermined number (step S130). In this way, not only the environment value but also the number of print copies in a predetermined time in the past is further utilized as an indicator for determining whether the environment inside the apparatus is stable. When the number of print copies in a predetermined time in the past is small, the process of detecting charging current for use in the film thickness estimating process is executed.

When the number of print copies in a predetermined time in the past is small, the environment inside image forming apparatus 100 is likely to be stable and therefore charging current is detected under a more stable environment. Consequently, image forming apparatus 100 can estimate the film thickness of photoconductor 10 more accurately.

Seventh Embodiment

Image forming apparatus 100 according to the foregoing sixth embodiment determines that the environment inside the apparatus is stable when the number of print copies in a predetermined time in the past falls below a predetermined number n. Here, in the sixth embodiment, the predetermined number n is fixed. By contrast, image forming apparatus 100 according to a seventh embodiment adjusts the predetermined number n depending on the temperature inside the apparatus.

In other respects, the configuration is the same as image forming apparatus 100 according to the first to sixth embodiments and will not be further elaborated below.

[Method of Determining Predetermined Number n]

Figure 15:
FIG. 15 is a diagram showing a table that defines the relation between temperature and predetermined number of sheets according to a seventh embodiment.

Referring to FIG. 15, a method of determining the predetermined number n serving as a reference of a stable environment will be described.

FIG. 15 is a diagram showing a table 126C that defines the relation between the temperature and the predetermined number n. In table 126C, the predetermined number n is associated with each range of temperature. In the example in FIG. 15, the lower the temperature is, the smaller th predetermined number n is. Table 126C is stored in advance in, for example, storage device 120 (see FIG. 9) of image forming apparatus 100, external equipment (for example, server), or any other storage medium.

Control device 101 of image forming apparatus 100 determines whether the state in which the environment value falls within a predetermined range continues for a predetermined time or longer, based on that the timing of determining whether the environment inside the apparatus is stable has come. When it is determined whether the state in which the environment value falls within a predetermined range continues for a predetermined time or longer, control device 101 acquires the temperature from the above-noted temperature sensor 107 (see FIG. 9). Control device 101 refers to table 126C to specify the predetermined number n corresponding to the detected temperature. Control device 101 thereafter determines whether the number of print copies in a predetermined time in the past falls below the specified predetermined number n. If it is determined that the number of print copies in a predetermined time in the past falls below the specified predetermined number n, control device 101 determines that the environment inside the apparatus is stable, and outputs an instruction to detect charging current to current sensor 53 (see FIG. 2, FIG. 3). Charging current is thus detected under a stable environment. Control device 101 estimates the film thickness of photoconductor 10 based on the charging current detected under a stable environment.

The numerical values in table 126C shown in FIG. 15 are by way of example, and any numerical values may be set in table 126C.

In the example in FIG. 15, the relation between the temperature and the predetermined number n is defined in the form of table 126C. However, the relation between the temperature and the predetermined number n may be represented by a relational expression. In the relational expression, the temperature is expressed as an explanatory variable, and the predetermined number n is expressed as a response variable.

Summary of Seventh Embodiment

As described above, image forming apparatus 100 according to the present embodiment adjusts the predetermined number n depending on the temperature inside the apparatus. Thus, a condition indicating whether the environment has become stable is set for each temperature. Therefore, image forming apparatus 100 can detect charging current under a more stable environment. As a result, image forming apparatus 100 can estimate the film thickness of photoconductor 10 more accurately.

Eighth Embodiment

[Overview]

Image forming apparatus 100 according to the first embodiment estimates the film thickness of photoconductor 10, based on the above-noted correlation 124 (see FIG. 4) indicating the relation between charging current and the film thickness of photoconductor 10. Here, in the first embodiment, correlation 124 is fixed regardless of the environment value such as temperature and humidity. By contrast, in an eighth embodiment, correlation 124 is prepared for each environment value such as temperature and humidity. Thus, image forming apparatus 100 can estimate the film thickness more accurately without being affected by temperature, humidity, and the like.

In other respects, the configuration is the same as image forming apparatus 100 according to the first to seventh embodiments and will not be further elaborated below.

[Method of Estimating Film Thickness]

Referring to FIG. 16, a method of estimating the film thickness of photoconductor 10 will be described.

FIG. 16 is a diagram showing a table 126D that defines the correlation between charging current and the film thickness of photoconductor 10 for each temperature and humidity. In table 126D, the correlation between charging current and the film thickness of photoconductor 10 is shown by a relational expression. In table 126D, the relational expression is defined for each temperature range and for each humidity range. Table 126D is stored in advance, for example, in storage device 120 (see FIG. 9) of image forming apparatus 100, external equipment (for example, server), or any other storage medium.

Control device 101 of image forming apparatus 100 acquires the temperature from the above-noted temperature sensor 107 (see FIG. 9) and acquires the humidity from the above-noted humidity sensor 108 (see FIG. 9), based on that the timing of estimating the film thickness of photoconductor 10 has come. Control device 101 refers to table 126D to specify the relational expression corresponding to the detected temperature and the detected humidity. Control device 101 thereafter substitutes the charging current detected under a stable environment into the specified relational expression and calculates the film thickness of photoconductor 10.

In table 126D in FIG. 16, the relational expression between charging current and the film thickness of photoconductor 10 is defined for each temperature and humidity. However, the relational expression may be defined for each temperature, or may be defined for each humidity, or may be defined for each of other environment values such as atmospheric pressure.

[Summary of Eighth Embodiment]

As described above, in the present embodiment, the correlation between charging current and the film thickness of photoconductor 10 is defined for each environment value such as temperature and humidity. Thus, image forming apparatus 100 can estimate the film thickness more accurately.

Ninth Embodiment

Image forming apparatus 100 according to the first embodiment detects charging current for use in the film thickness estimating process at any timing after the state in which the environment value falls within a predetermined range continues for a predetermined time or longer and if the environment value falls within a predetermined range. By contrast, in a ninth embodiment, charging current for use in the film thickness estimating process is detected during the course of the print process under a stable environment.

More specifically, image forming apparatus 100 usually detects charging current during the print process and determines charging voltage to be applied to charging roller 12 based on the detected charging current. If the charging current detected during the course of this charging voltage determining process is also used in estimation of the film thickness, image forming apparatus 100 no longer needs to detect charging current for the film thickness estimating process. Therefore, it is preferable that the value of charging current for use in estimation of the film thickness is the one detected in the charging voltage determining process executed in a situation in which the environment inside image forming apparatus 100 is stable. This can suppress unnecessary rotation of photoconductor 10 and suppress wear of photoconductor 10.

SUMMARY

According to an aspect, an image forming apparatus includes a photoconductor, a charging roller for charging the photoconductor, a detection unit for detecting a value of current flowing through the photoconductor or the charging roller as a result of application of voltage to the charging roller, an acquisition sensor for acquiring an environment value representing an environment state inside the image forming apparatus, and a control device configured to estimate the film thickness of the photoconductor based on the value of current detected by the detection unit when a state in which the environment value falls within a predetermined range continues for a predetermined time or longer.

Preferably, the control device calculates a reduction rate of the film thickness based on the amount of change in the film thickness and the amount of use of the photoconductor at a point of time of estimation of the film thickness and predicts the life of the photoconductor based on the reduction rate.

Preferably, the control device outputs that the photoconductor reaches the end of life when the estimated film thickness falls below a predetermined value.

Preferably, the acquisition sensor includes a temperature sensor for detecting temperature inside the image forming apparatus as the environment value.

Preferably, the acquisition sensor includes a humidity sensor for detecting humidity inside the image forming apparatus as the environment value.

Preferably, the control device estimates the film thickness based on the value of current, the temperature, and the humidity.

Preferably, the control device narrows the predetermined range as the temperature detected by the temperature sensor decreases.

Preferably, the value of current for use in a process of estimating the film thickness is detected when the number of print copies in a predetermined time by the image forming apparatus falls below a predetermined number.

Preferably, the control device executes a determination process for determining a magnitude of voltage to be applied to the charging roller, based on the value of current detected by the detection unit, during a print process by the image forming apparatus. The value of current detected by the detection unit during the determination process is used for estimation of the film thickness.

According to another aspect, an estimation method for estimating a film thickness of a photoconductor included in an image forming apparatus includes the steps of: applying voltage to a charging roller for charging the photoconductor; detecting a value of current flowing through the photoconductor or the charging roller as a result of application of the voltage to the charging roller; acquiring an environment value representing an environment state inside the image forming apparatus; and estimating the film thickness of the photoconductor, based on the value of current detected in the step of detecting when a state in which the environment value falls within a predetermined range continues for a predetermined time or longer.

According to another aspect, an estimation program for estimating a film thickness of a photoconductor included in an image forming apparatus causes the image forming apparatus to execute the steps of: applying voltage to a charging roller for charging the photoconductor; detecting a value of current flowing through the photoconductor or the charging roller as a result of application of the voltage to the charging roller; acquiring an environment value representing an environment state inside the image forming apparatus; and estimating the film thickness of the photoconductor, based on the value of current detected in the step of detecting when a state in which the environment value falls within a predetermined range continues for a predetermined time or longer.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
   a photoconductor;
   a charging roller for charging said photoconductor;
   a current sensor for detecting a value of current flowing through said photoconductor or said charging roller as a result of application of voltage to said charging roller;
   an acquisition sensor for acquiring an environment value representing an environment state inside said image forming apparatus; and
   a processor configured to
      determine that an environment of the image forming apparatus is stable, wherein said environment is determined to be stable when (i) said environment value falls within a predetermined range, and (ii) said environment value remains within said predetermined range for a predetermined time or longer, and
      estimate a film thickness of said photoconductor, based on said value of current detected by said current sensor in response to determining that the environment of the image forming apparatus is stable.

2. The image forming apparatus according to claim 1, wherein said processor calculates a reduction rate of said film thickness based on the amount of change in said film thickness and the amount of use of said photoconductor at a point of time of estimation of said film thickness and predicts life of said photoconductor based on the reduction rate.

3. The image forming apparatus according to claim 1, wherein said processor outputs that said photoconductor reaches the end of life when said estimated film thickness falls below a predetermined value.

4. The image forming apparatus according to claim 1, wherein said acquisition sensor includes a temperature sensor for detecting temperature inside said image forming apparatus as said environment value.

5. The image forming apparatus according to claim 4, wherein said acquisition sensor includes a humidity sensor for detecting humidity inside said image forming apparatus as said environment value.

6. The image forming apparatus according to claim 5, wherein said processor estimates said film thickness based on said value of current, said temperature, and said humidity.

7. The image forming apparatus according to claim 4, wherein said processor narrows said predetermined range as temperature detected by said temperature sensor decreases.

8. The image forming apparatus according to claim 1, wherein said value of current for use in a process of estimating said film thickness is detected when the number of print copies in the predetermined time by said image forming apparatus falls below a predetermined number.

9. The image forming apparatus according to claim 1, wherein
said processor executes a determination process for determining a magnitude of voltage to be applied to said charging roller, based on said value of current detected by said current sensor, during a print process by said image forming apparatus, and
said value of current detected by said current sensor during said determination process is used for estimation of said film thickness.

10. A non-transitory recording medium storing a computer readable program for estimating a film thickness of a photoconductor included in an image forming apparatus, said program causing said image forming apparatus to execute:
applying voltage to a charging roller for charging said photoconductor;
detecting a value of current flowing through said photoconductor or said charging roller as a result of application of said voltage to said charging roller;
acquiring an environment value representing an environment state inside said image forming apparatus;
determining that an environment of the image forming apparatus is stable, wherein said environment is determined to be stable when (i) said environment value falls within a predetermined range, and (ii) said environment value remains within said predetermined range for a predetermined time or longer, and
estimating a film thickness of said photoconductor, based on said value of detected current, in response to determining that the environment of the image forming apparatus is stable.

11. The non-transitory recording medium according to claim 10, wherein said program causes said image forming apparatus to further execute outputting that said photoconductor reaches the end of life when said estimated film thickness falls below a predetermined value.

12. The non-transitory recording medium according to claim 10, wherein said acquiring includes acquiring said environment value from a temperature sensor for detecting temperature inside said image forming apparatus.

13. The non-transitory recording medium according to claim 12, wherein said acquiring includes acquiring said environment value from a humidity sensor for detecting humidity inside said image forming apparatus.

14. The non-transitory recording medium according to claim 13, wherein said estimating includes estimating said film thickness based on said value of current, said temperature, and said humidity.

15. The non-transitory recording medium according to claim 12, wherein said program causes said image forming apparatus to further execute narrowing said predetermined range as temperature detected by said temperature sensor decreases.

16. The non-transitory recording medium according to claim 10, wherein said value of current for use in a process of estimating said film thickness is detected when the number of print copies in the predetermined time by said image forming apparatus falls below a predetermined number.

17. The non-transitory recording medium according to claim 10, wherein
said program causes said image forming apparatus to further execute a determination process for determining a magnitude of voltage to be applied to said charging roller, based on said detected value of current, during a print process by said image forming apparatus, and
said value of current detected during said determination process is used for estimation of said film thickness.

18. The image forming apparatus according to claim 1, wherein said predetermined time is measured in hours.

19. The non-transitory recording medium according to claim 10, wherein said program causes said image forming apparatus to further execute the step of calculating a reduction rate of said film thickness based on the amount of change in said film thickness and the amount of use of said photoconductor at a point of time of estimation of said film thickness, and predicting life of said photoconductor based on the reduction rate.

20. The non-transitory recording medium according to claim 10, wherein said predetermined time is measured in hours.

* * * * *